United States Patent
Richardson et al.

(10) Patent No.: US 7,449,650 B2
(45) Date of Patent: Nov. 11, 2008

(54) MULTI-DIRECTIONAL ACTIVATION BUTTON

(75) Inventors: Curtis R. Richardson, Fort Collins, CO (US); Alan Morine, Fort Collins, CO (US); Douglas Kempel, Fort Collins, CO (US)

(73) Assignee: Otter Products, LLC, Fort Collins, CO (US)

( * ) Notice: Subject to any disclaimer, the term of this patent is extended or adjusted under 35 U.S.C. 154(b) by 0 days.

(21) Appl. No.: 11/777,835

(22) Filed: Jul. 13, 2007

(65) Prior Publication Data

US 2008/0017493 A1    Jan. 24, 2008

Related U.S. Application Data

(60) Provisional application No. 60/807,726, filed on Jul. 19, 2006.

(51) Int. Cl.
    *H01H 9/00* (2006.01)
(52) U.S. Cl. .................. 200/331; 200/5 R; 200/6 A
(58) Field of Classification Search .......... 200/5 R, 200/18, 17 R, 4, 6 A, 302.1, 302.2, 302.3, 200/333, 331, 330, 512, 329, 341, 296; 341/20–22; 345/156, 157, 161, 162, 168, 169, 184
    See application file for complete search history.

(56) References Cited

U.S. PATENT DOCUMENTS

| | | | | |
|---|---|---|---|---|
| 4,823,397 A | * | 4/1989 | Hewitt | 455/90.3 |
| 5,380,968 A | * | 1/1995 | Morse | 200/302.3 |
| 5,508,479 A | * | 4/1996 | Schooley | 200/5 R |
| 5,626,222 A | * | 5/1997 | Aguilera | 200/305 |
| 5,725,086 A | * | 3/1998 | Cooper | 200/302.3 |
| 5,788,059 A | * | 8/1998 | Jahangiri | 200/302.3 |
| 6,274,826 B1 | * | 8/2001 | Serizawa et al. | 200/5 R |
| 6,608,270 B2 | * | 8/2003 | Donofrio et al. | 200/302.1 |
| 6,831,238 B1 | * | 12/2004 | Lau | 200/6 A |
| 7,322,759 B2 | * | 1/2008 | Rak et al. | 400/486 |
| 7,326,869 B2 | * | 2/2008 | Flynn et al. | 200/341 |

* cited by examiner

*Primary Examiner*—Michael A. Friedhofer
(74) *Attorney, Agent, or Firm*—William W. Cochran; Cochran Freund & Young LLC

(57) ABSTRACT

Disclosed is a multi-directional activation button disposed on a protective case for activating a multi-directional control device on an electronic device. The multi-directional activation button has a flexible membrane with a top side divided into directional surfaces that are aligned with a plurality of directions of operation of said multi-directional activation button. A membrane supports an extension that engages the multi-directional control device. The membrane has a length from a pivot point that controls the direction and the amount of movement of an activation extension wherein movement from the pivot point simulates an extension of a user's finger depending upon which directional surface of the rubber membrane is depressed by the user's finger. The multi-directional activation button may be utilized for push button activation, toggle slide operations, dial wheel, or joy stick like operations.

6 Claims, 4 Drawing Sheets

MULTI-DIRECTIONAL ACTIVATION BUTTON

CROSS REFERENCE TO RELATED APPLICATIONS

The present application is based upon U.S. provisional application Ser. No. 60/807,726, filed Jul. 19, 2006, by Curtis R. Richardson, et al., entitled "Sealed Multi-Activation Button." The entire content of this application is hereby specifically incorporated herein by reference for all it discloses and teaches.

BACKGROUND OF THE INVENTION

Handheld devices such as personal digital assistants (PDA), pagers, hand-held computers, cellular phones, and so forth are inherently small and have limited space for user interface and operation. These devices have greatly expanded the functions and operations available for the user. Additional features include multi-directional control devices such as dial wheels, scroll balls, slide switches, etc. Multi-direction control devices may provide improved navigation through the multiple functions performed by an electronic device, such as a PDA or handheld computer, by limiting the number of switches needed, and providing various capabilities at fingertip control. However, when these devices are placed in a protective case, through-case controls are generally not available for operating these multi-directional control devices.

SUMMARY OF THE INVENTION

An embodiment of the present invention comprises a multi-directional activation button that is disposed on a protective case for an electronic device that contacts and moves a multi-directional control device disposed on said electronic device comprising an interactive extension comprising: a plurality of directional surfaces on a user activation side of the interactive extension that allows the interactive extension to be moved in a plurality of directions upon application of a force by a user on the plurality of directional surfaces; a contact surface on a device activation side of the interactive extension that engages and operates the multi-directional control device; a membrane that is connected to the interactive extension that holds the interactive extension in a recessed position, and that has a sufficient length to allow the activation extension to move inwardly towards the electronic device and to move in a direction to engage and operate the multi-directional control device upon application of a force on at least one of the directional surfaces of the interactive extension.

Another embodiment of the present invention comprises a method of operating a multi-directional control device on an electronic device disposed in a protective case using a multi-directional activation button comprising: providing an interactive extension in the multi-directional activation button that has a plurality of directional surfaces and a contact surface for engaging the multidirectional control device; providing a membrane that is connected to the interactive extension that holds the interactive extension in a recessed position and that allows the interactive extension to extend in a plurality of directions by an amount that is sufficient to engage the multi-directional control device with the contact surface of the interactive extension; asserting a force on a first directional surface of the plurality of directional surfaces to cause the interactive extension to extend in a first direction that is substantially aligned with the first directional surface and cause the contact surface to engage the control device on the electronic device to operate the control device in the first direction; asserting a force on a second directional surface of the plurality of directional surfaces to cause the interactive extension to extend in a second direction that is substantially aligned with the second directional surface and cause the contact surface to engage the control device on the electronic device to operate the control device in the second direction.

DETAILED DESCRIPTION OF THE INVENTION

Figure 1:
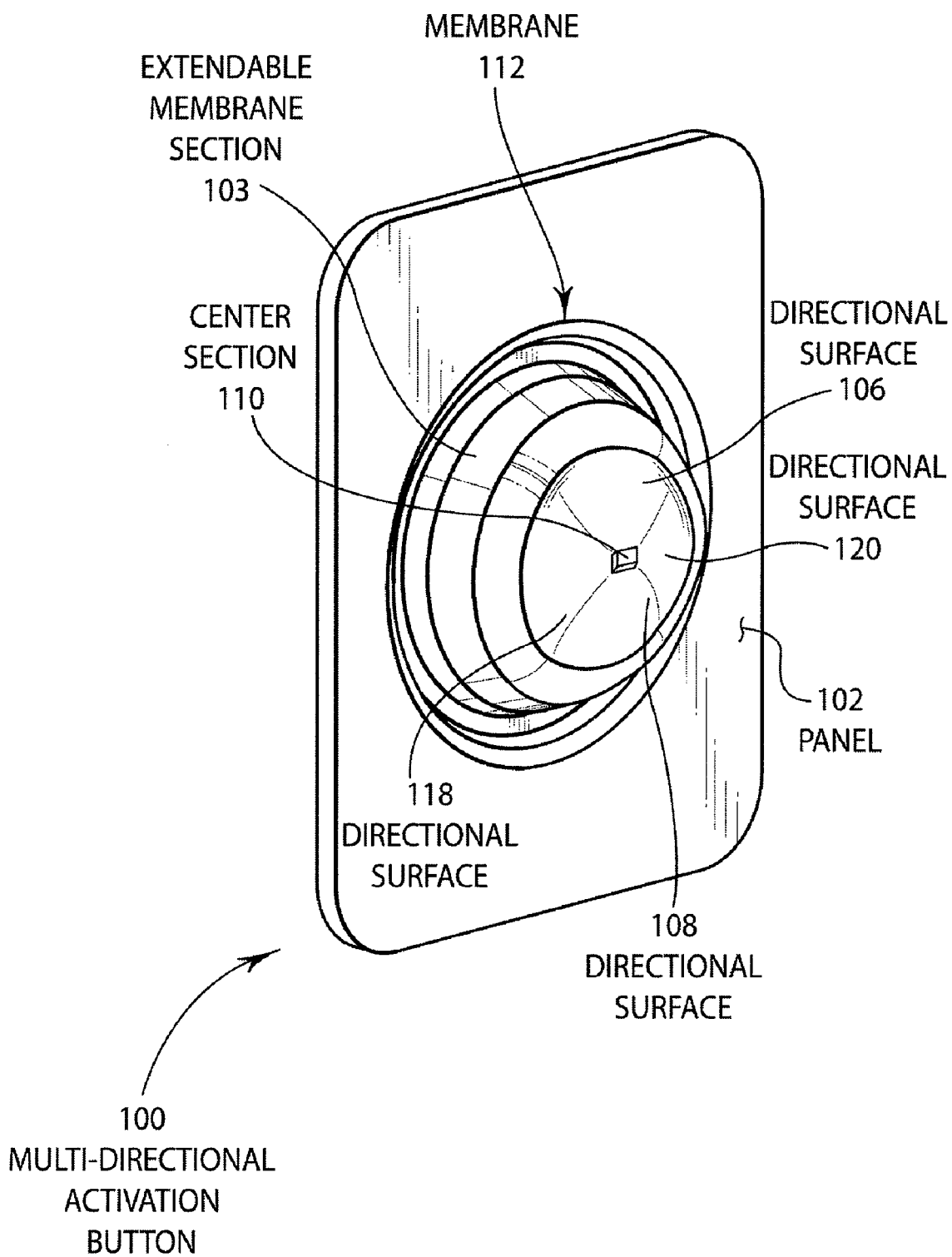
FIG. 1 is a perspective view of one embodiment of the outside surface of a multi-activation button.

Referring to FIG. 1, there is shown a perspective view of the user activation side (outside) portion of an embodiment of a multi-directional activation button 100 mounted on a panel 102. The panel 102 may be part of any type of protective case for an electronic device, such as, but not by way of limitation, personal digital assistants (PDA), pagers, hand-held computers, cellular phones, etc. However, the button 100 is particularly adaptable for use with electronic devices protected by waterproof and shock resistant enclosures, such as those described in the co-pending related applications such as U.S. application Ser. No. 11/270,732 filed Nov. 8, 2005 by Curtis R. Richardson, et al entitled "Protective Case for Touch Screen Device," U.S. application Ser. No. 10/937,048 filed Sep. 8, 2004 by Curtis R. Richardson, et al entitled "Protective Enclosure for an Interactive Flat-Panel Controlled Device," and U.S. application Ser. No. 11/077,963 filed Mar. 10, 2005 by Curtis R. Richardson, et al entitled "Protective Enclosure and Watertight Adapter for an Interactive Flat-Panel Controlled Device," which are all assigned to the assignee of the instant application and which are specifically incorporated herein by reference for all that they disclose and teach. These applications describe electronic devices enclosed in a protective case that are adaptable for use by a user through a membrane on the case and activation buttons mounted on the case. In these types of protective cases, the user can preferably operate the electronic device directly through the protective casing. However, it has been difficult to operate multi-directional control devices, such as dial wheels, slide switches, scroll balls and similar types of interfaces, through a protective case. Multi-directional activation through a protective case can be achieved using a multi-directional activation button that can be mounted on a protective case adjacent to a multi-directional control device or the electronic device.

Figure 2:
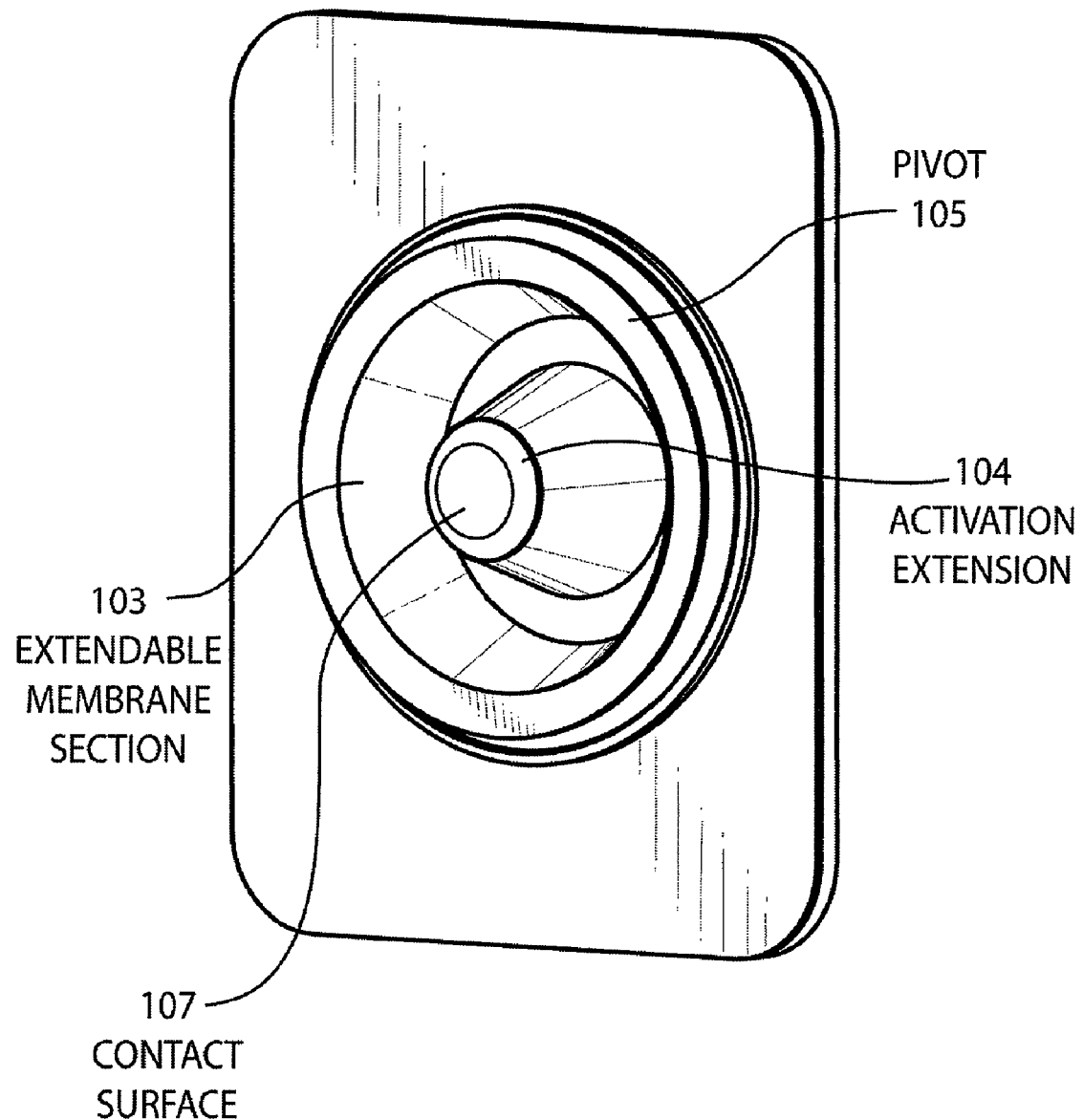
FIG. 2 is a perspective view of the embodiment of FIG. 1 illustrating the inside surface of a multi-activation button.

FIG. 1 discloses the user activation side of one embodiment of a multi-directional activation button 100 that is comprised of flexible material such as a rubberized material, or other elastic material, with a unique design that allows activation of an extension that simulates finger tip motions. Since the activation button 100 is comprised of flexible material and is elastic enough to extend and activate dials and switches, the activation button 100 can be used as part of an environmental protective case, so that the electronic device, having multi-directional activation interface control devices, can be activated through the case. The button 100 is generally supported on a panel 102 on the protective case by a membrane 112, which comprises an extendable membrane section 103 and pivot areas 105 (FIG. 2). The upper portion of the button is divided into directional surfaces 106 and 108 with a center section 110. Additional directional surfaces 118 and 120 may also be provided. Each of these directional surfaces allows the user to operate the multi-directional activation button in a plurality of directions to operate a multi-directional control device in multiple directions.

Figure 3A:
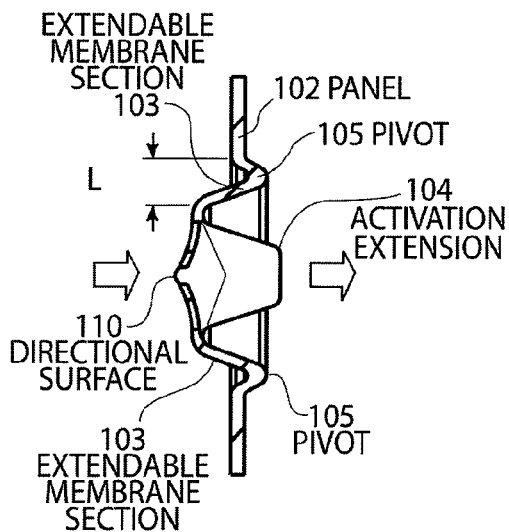
FIG. 3A illustrates a sectional view of the multi-activation button of the embodiment of FIG. 1 for conventional push-button activation.
Figure 3B:
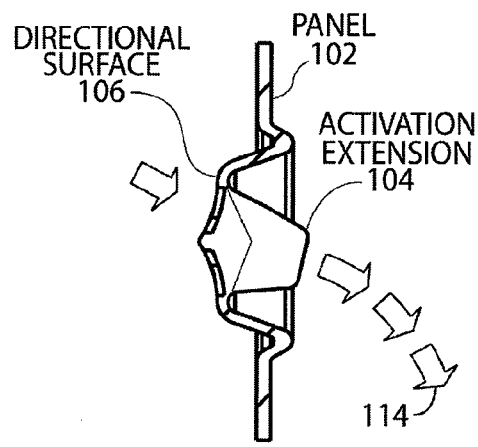
FIG. 3B illustrates a sectional view of the multi-activation button of the embodiment of FIG. 1 for scroll wheel activation in clockwise direction.
Figure 3C:
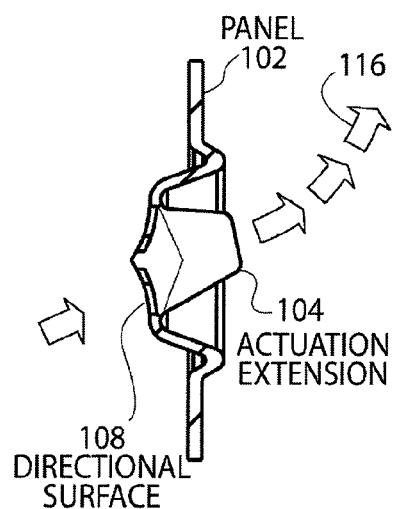
FIG. 3C illustrates a sectional view of the multi-activation button of the embodiment of FIG. 1 for scroll wheel activation in counterclockwise direction.

As seen in FIG. 2 and FIGS. 3A-3D, the device activation side of the button, that is disposed on the inside of a protective case, has a recessed activation extension 104. Although in this embodiment the activation extension 104 has a conical shape with a round contact surface 107, other shapes can be used to interface with a multi-directional activation interface control devices in a better or more efficient manner. Activation extension 104 is disposed to move in a direction depending upon which one of the directional surfaces 106, 108, 118 or 120 of the button is pushed. An extendable membrane section 103, which is formed in the flexible membrane 112, extends to allow movement of the recessed activation extension 104, so that the activation extension 104 can interact with a multi-directional activation control device, such as a control ball, dial wheel, slide switch, etc., disposed on an electronic device, or other device, that may be disposed in a protective case. The extendable membrane section 103 pivots at pivot area 105, depending upon which directional surface is pushed, to move the activation extension 104. In one embodiment, as shown in FIGS. 3A, 3B and 3C, the button can be activated in at least three directions, depending on whether the button is pushed at directional surfaces 106, 108 or 110. Additional directions can be obtained by pushing on additional directional surfaces 118 or 120. In fact, the extendable membrane section 103 allows the center portion of the activation extension 104 to move in a plurality of directions, depending upon the direction of force that is applied by a user's finger. The activation extension 104 is adapted to engage a multi-directional control device 119, such as dial wheel 117 (FIG. 3D), or a slide switch, such as slide switch 122 (FIGS. 4A and 4B). The activation extension 104 extends from the multi-directional activation button 100 upon application of a force by a user to the center section 110, or one of the directional surfaces 106, 108, 118 or 120. As a result, the activation extension 104 makes contact with a multi-directional control device, and then moves back to a recessed position. The range of motion and functionality of the button is controlled by the thickness and size of the membrane 112 and the length "L" of the extendable membrane section 103 surrounding the activation extension 104, as well as the elasticity of the membrane material.

As shown in FIG. 3A, the length "L" of the extendable membrane section 103 controls the extent of movement of the activation extension 104. If the activation button 100 is pushed at center section 110, the activation extension 104 moves directly inwardly in a straight line substantially normal to panel 102 and functions like the traditional on-off push button. If mounted on a protective housing for an electronic device such as PDA, Ipod, etc., the activation extension 104 simulates the extension of the user's finger and can activate multi-directional control devices, such as push buttons or switches, on the electronic device. As illustrated in FIG. 3B, if a user applies force to the directional surface 106, the activation extension 104 is pushed inwardly and extends in a downward direction, so as to move and generate a force, as shown by arrows 114. The activation extension 104 may engage a dial wheel, such as dial wheel 117 (FIG. 3D), or a slide switch, such as slide switch 122 (FIGS. 4A, 4B), so that the force vector in the tangential direction along the dial wheel 117 will cause the dial wheel 117 to rotate in a counterclockwise direction. Similarly, the downward vector component of the force 114 of the activation extension 104 will cause the slide switch 122 to move in a downward direction, such as shown in FIG. 4A.

As shown in FIG. 3C, force applied by a user on directional face 108 will cause the activation extension 104 to move in an inward and upward direction, such as the direction shown by arrows 116. As illustrated in FIG. 3C, as a user applies force to the directional face 108, the activation extension 104 causes the pivot arm 105 to move the activation extension 104 to the position shown in FIG. 3C. As further force is applied, the activation extension 104 extends further in an inward direction from the plate 102, so that the motion and directional force vectors become directed in a more vertical direction, as shown by arrows 116 in FIG. 3C. Hence, the activation extension 104 protrudes inwardly, as more force is applied to the directional face 108, and is directed in a more upward direction, as the activation extension is extended more to the inside surface of the panel 102. As a result, the motion and force vector in an upward direction becomes greater, as shown by the arrows 116.

Figure 3D:
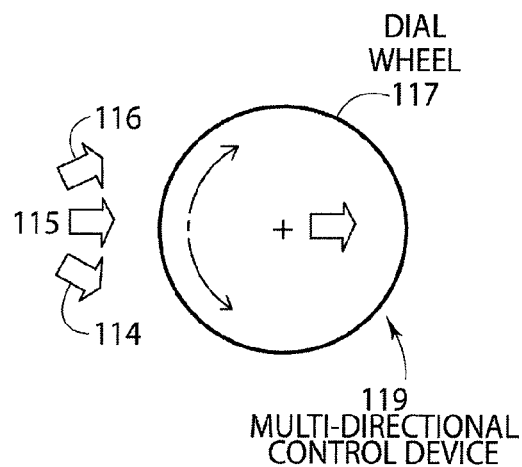
FIG. 3D illustrates the manner in which the multi-activation button interacts with a scroll wheel.
Figure 4A:
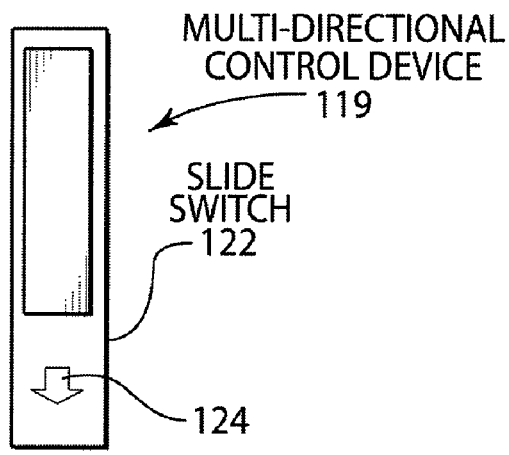
FIGS. 4A, 4B, and 4C illustrate the directions for toggle switch activation.
Figure 4B:
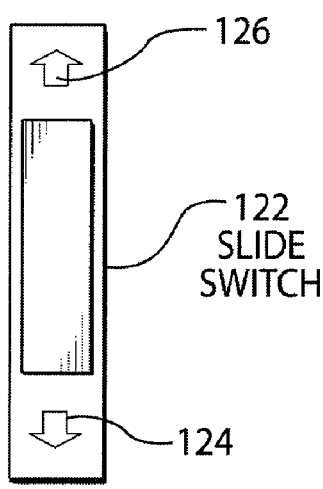

As shown in FIG. 3D, dial wheel 117 may be part of an electronic device that is disposed in a protective case or other environment in which a user cannot directly access the dial wheel 17. The activation extension is capable of moving in the directions illustrated by arrows 114, 115 and 116. The activation extension 104 may have a surface that is designed to engage the dial wheel 117 and move the dial wheel in the directions shown by arrows 114, 115 and 116. Generation of a force on directional surface 106 (FIG. 3B) creates movement of the activation extension 104 in the direction illustrated by arrow 114 to cause the dial wheel 117 to move in a counterclockwise direction. Similarly, application of force on directional surface 108 (FIG. 3C) causes activation extension 104 to extend in the direction illustrated by arrows 116 to cause the dial wheel 117 to rotate in a clockwise direction. Application of a force on directional surface 110 causes the dial wheel 117 to move in an inward direction, which may be an on/off function of some dial wheels.

The additional directional surfaces 118, 120 may be used to generate movement in the transverse directions to those shown in FIGS. 3B and 3C. Movement of the activation extension 104 in the transverse directions may allow interaction with a scroll ball, such as those found on Blackberry phones, joy stick devices, or other types of devices that require movement in the transverse direction.

Figure 4C:
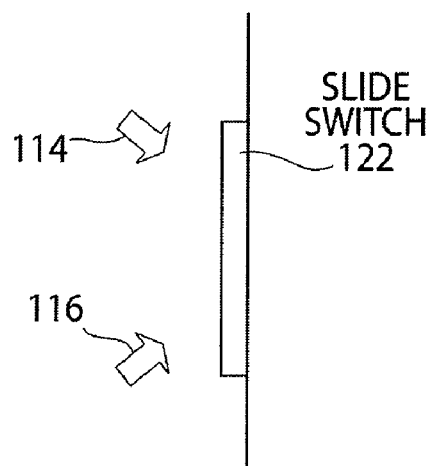

FIGS. 4A, 4B and 4C illustrate the manner in which a slide switch 122 may be operated using the multi-directional activation button 100. As shown in FIGS. 4A through 4C, slide switch 122 moves in a vertical direction, as indicated by arrows 124, 126. Application of force on the directional surface 106 (FIG. 3B) generates a downward and inward movement of the activation extension 104, as shown by arrows 114. The surface of the activation extension 104 can be made to engage the slide switch 122 to move the slide switch 122 downwardly in the direction of arrow 124, as shown by the movement of the activation extension 104 by arrow 114. Similarly, the slide switch 122 can be moved in an upward direction 126 by application of force on directional surface 108 (FIG. 3C) to move the activation extension 104 in the direction of arrow 116. Slide switches, such as toggle switches that have more than one position, can be operated in this manner using the multi-directional activation button 100.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A multi-directional activation button that is disposed on a protective case for an electronic device that contacts and moves a multi-directional control device disposed on said electronic device comprising:
    an interactive extension comprising:
        a plurality of directional surfaces on a user activation side of said interactive extension that allows said interactive extension to be moved in a plurality of directions upon application of a force by a user on said plurality of directional surfaces;
        a contact surface on a device activation side of said interactive extension that engages and operates said multi-directional control device;
    a membrane that is connected to said interactive extension that holds said interactive extension in a recessed position, and that has a sufficient length to allow said activation extension to move inwardly towards said electronic device and to move in a direction to engage and operate said multi-directional control device upon application of a force on at least one of said directional surfaces of said interactive extension.

2. The multi-directional activation button of claim 1 wherein said plurality of directional surfaces are on two surfaces of said interactive extension.

3. The multi-directional activation button of claim 1 wherein said plurality of directional surfaces are on three surfaces of said interactive extension.

4. The multi-directional activation button of claim 1 wherein said plurality of directional surfaces are on five surfaces of said interactive extension.

5. A method of operating a multi-directional control device on an electronic device disposed in a protective case using a multi-directional activation button comprising:
    providing an interactive extension in said multi-directional activation button that has a plurality of directional surfaces and a contact surface for engaging said multidirectional control device;
    providing a membrane that is connected to said interactive extension that holds said interactive extension in a recessed position and that allows said interactive extension to extend in a plurality of directions by an amount that is sufficient to engage said multi-directional control device with said contact surface of said interactive extension;
    asserting a force on a first directional surface of said plurality of directional surfaces to cause said interactive extension to extend in a first direction that is substantially aligned with said first directional surface and cause said contact surface to engage said control device on said electronic device to operate said control device in said first direction;
    asserting a force on a second directional surface of said plurality of directional surfaces to cause said interactive extension to extend in a second direction that is substantially aligned with said second directional surface and cause said contact surface to engage said control device on said electronic device to operate said control device in said second direction.

6. The method of claim 5 further comprising:
    asserting a force on at least one additional directional surface of said plurality of directional surfaces to cause said interactive extension to extend in at least one additional direction that is substantially aligned with said at least one additional directional surface and cause said contact surface to engage said control device on said electronic device to operate said control device in said at least one additional direction.

* * * * *